July 10, 1962

M. R. STEINBERG 3,043,389

POWER DRIVEN RIDING GOLF CART

Filed April 11, 1960

INVENTOR.
MAX R. STEINBERG
BY
Whittemore, Hulbert
& Belknap
ATTORNEYS

July 10, 1962  M. R. STEINBERG  3,043,389
POWER DRIVEN RIDING GOLF CART
Filed April 11, 1960  3 Sheets-Sheet 2

INVENTOR.
MAX R. STEINBERG
BY
Whittemore, Hulbert
& Belknap
ATTORNEYS.

July 10, 1962 M. R. STEINBERG 3,043,389
POWER DRIVEN RIDING GOLF CART
Filed April 11, 1960 3 Sheets-Sheet 3
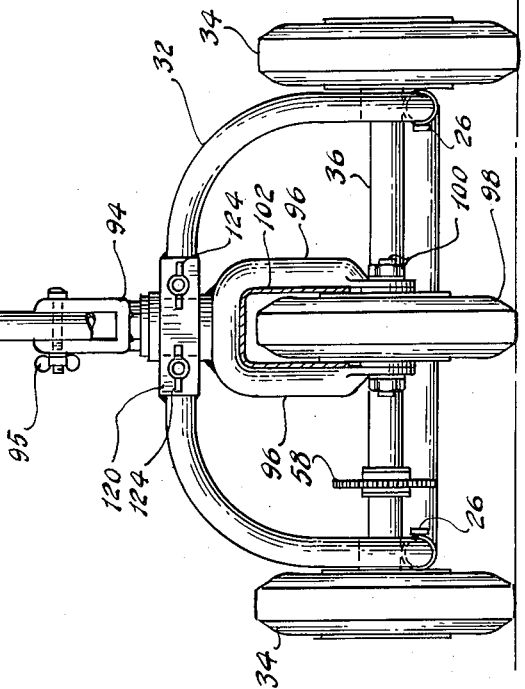
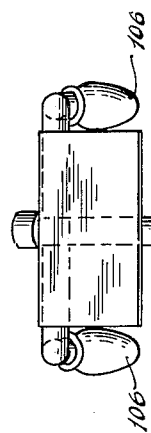
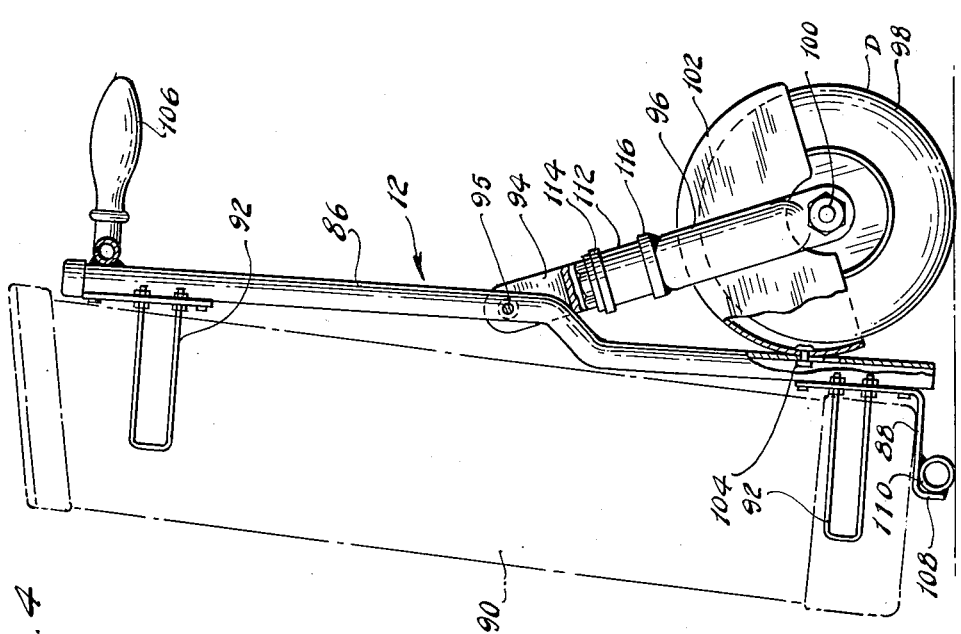
INVENTOR.
MAX R. STEINBERG
BY
*Whittemore, Hulbert*
*& Belknap*
ATTORNEYS

United States Patent Office 3,043,389
Patented July 10, 1962

3,043,389
POWER DRIVEN RIDING GOLF CART
Max R. Steinberg, 24051 Church St., Oak Park, Mich.
Filed Apr. 11, 1960, Ser. No. 21,172
16 Claims. (Cl. 180—27)

This invention relates to a foldable power-driven golf cart or vehicle which is adapted to carry the golf bag and to provide transportation for the player or occupant. More particularly, this invention relates to a power-driven vehicle which is usable over hilly terrain and which can be folded into a substantially rectangular package so that it may be transported in the trunk of an automobile or by other means. This invention is characterized by its unique structural arrangement which permits the power-driven vehicle to be easily collapsible and foldable into a small and compact package with a minimum amount of time and effort.

It is an object of the present invention to provide a lightweight power-driven vehicle which is adapted so that it may be folded into a convenient size package for transporting it in the trunk of an automobile or by other means.

It is another object of the present invention to provide a foldable gasoline engine-driven golf cart which is designed to carry golf clubs and a single occupant.

Still another object of the invention is to provide a foldable two-unit vehicle which includes a front unit having only a single ground-engaging wheel and a rear power driven unit which includes a pair of ground-engaging wheels, said rear unit utilizing a telescopic tubular frame which includes means for removably connecting said front unit to said rear unit.

Another object of the invention is to provide a foldable two-unit vehicle which includes a front unit having only a single ground-engaging wheel and a rear power-driving unit which includes a pair of ground-engaging wheels, said rear unit utilizing a telescopic tubular frame which includes means for connecting the front unit thereto, said front unit being adapted so as to be readily removable from the frame so that the frame may be telescoped to reduce its overall length thereby providing a compact packaged vehicle suitable for convenient transportation.

A further object of the invention is to provide a foldable power-driven vehicle which includes a front unit having a single ground-engaging wheel and means for supporting a golf bag or the like and a rear power-driving unit for driving the front unit and having a pair of ground-engaging wheels and means for supporting the driver, said rear unit utilizing a telescopic tubular frame which includes means for connecting said front unit to said rear unit, said front unit being adapted so as to be readily removable from the frame so that the frame may be telescoped to reduce its overall length thereby providing a compact packaged vehicle suitable for convenient transportation.

A still further object of the invention is to provide a foldable riding golf cart which is adapted to transport a single occupant over a hilly terrain and which is characterized by its extreme simplicity, reliability, low cost, efficiency, and the ease with which it may be assembled and disassembled.

Other objects and features of the invention will become apparent as the description proceeds, especially when taken in conjunction with the accompanying drawings illustrating a preferred embodiment of the invention, wherein:

FIGURE 3 is a front view of the invention.

FIGURE 4 is a side view of the single-wheel front unit which provides means for carrying a golf bag.

Figure 1:
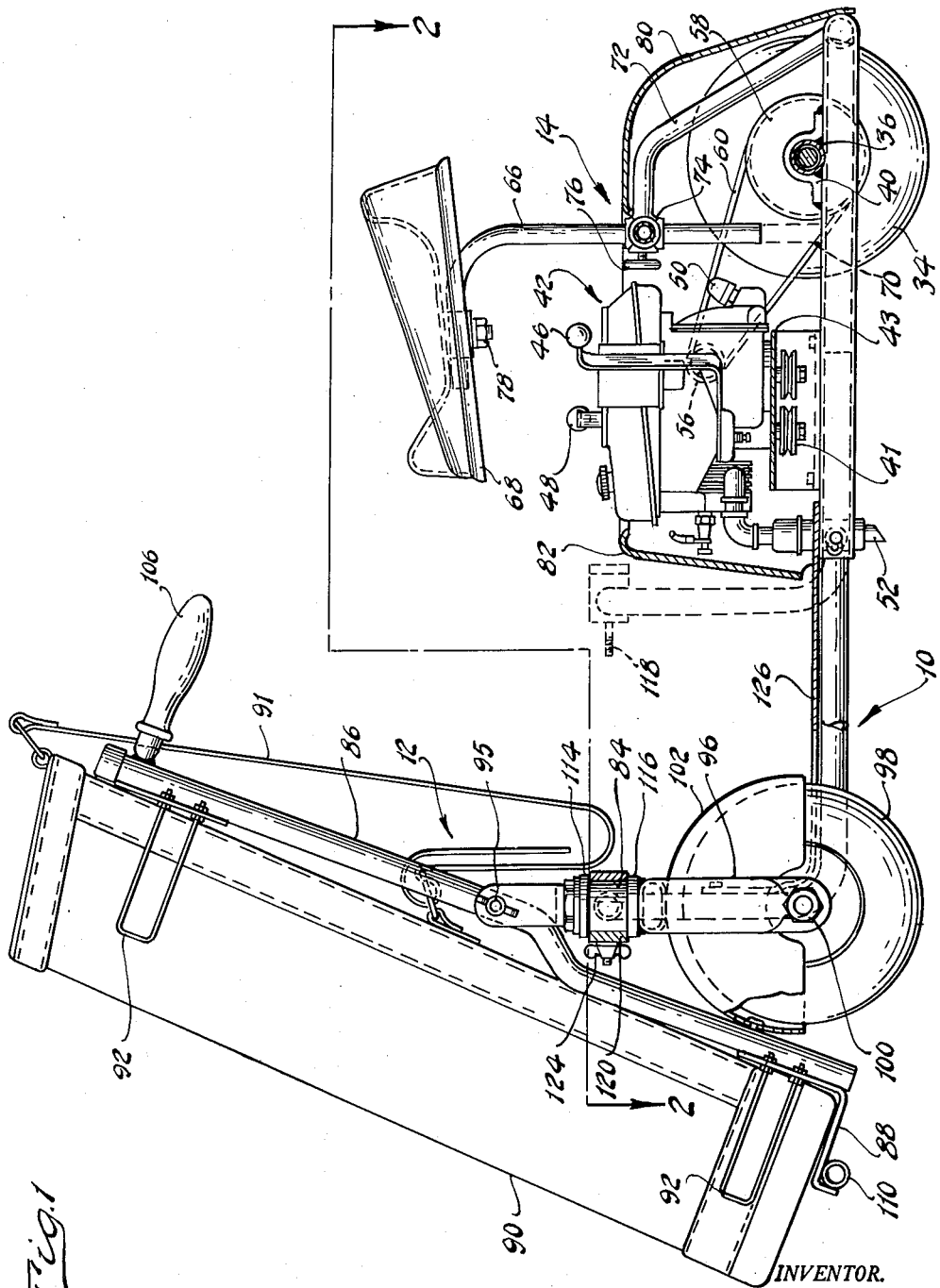
FIGURE 1 is a side elevation of the invention, partly in section.

The power-driven golf cart is designated by the numeral 10 and includes a front unit 12 as shown in FIGURE 4 and a rear power unit 14 as shown in FIGURE 1, for driving the front unit 12.

Figure 2:
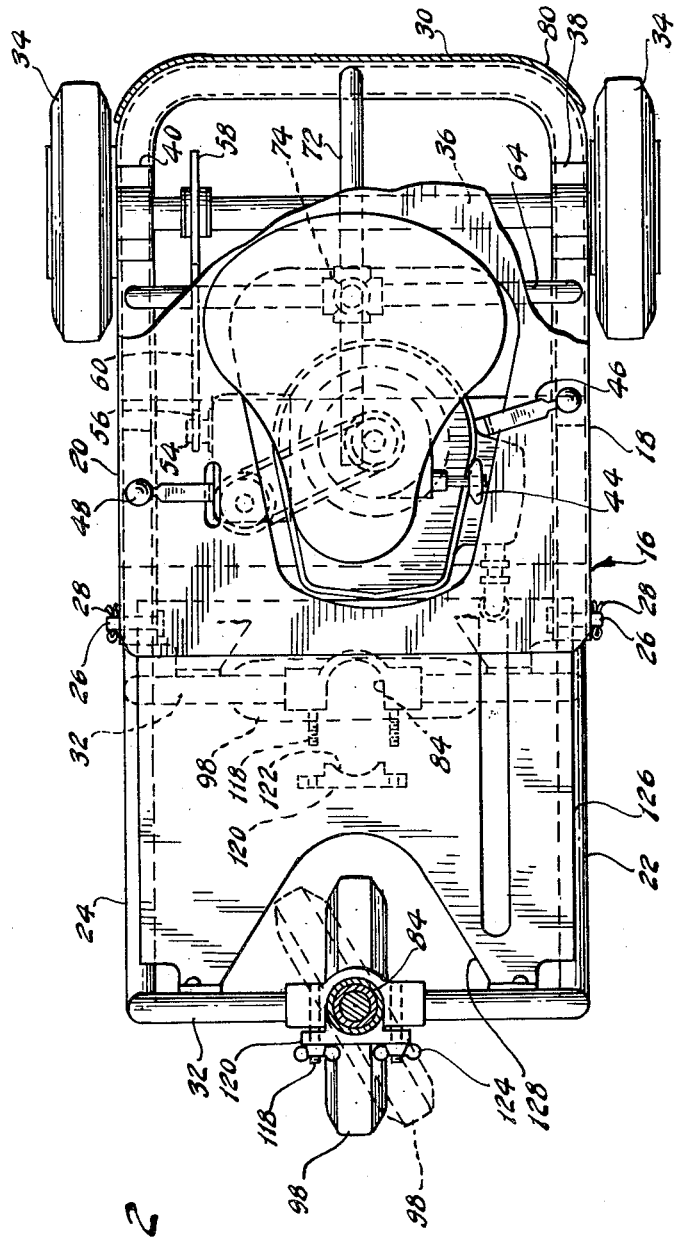
FIGURE 2 is a plan view of the invention taken on line 2—2 of FIGURE 1.

The rear unit 14 has a telescopic tubular horizontal frame 16. The frame 16 includes a pair of parallel tubular side frame members 18 and 20 which have the tubular extension members 22 and 24 telescopically positioned therein. Means are provided in the frame for inserting bolts 26 through the corresponding side and extension members to hold the frame in an extended position. Cotter pins 28 hold the bolts in locking position. When it is desirable to fold the vehicle into a convenient compact package the pins 28 and bolts 26 are removed and the extension members 22 and 24 are slid inwardly to the position shown by the dotted lines in FIGURE 2, thereby reducing the overall length of the vehicle 10. This will be further explained later on in the specification.

The parallel tubular frame side members 18 and 20 each have an inside diameter which is somewhat larger than the outside diameter of the extension members 22 and 24. This permits the extension members to be telescopically disposed within members 18 and 20. The frame members 18 and 20 are interconnected at the outer ends by the laterally extending frame member 30 which is also of tubular construction. The extension frame members 22 and 24 are interconnected through a substantially U-shaped vertical front member 32 as is best shown in FIGURE 3. Member 32 includes means for connecting the front unit 12 thereto as will be subsequently described.

The rear unit 14 includes a pair of ground engaging wheels 34 which are rotatably mounted on the axle 36 which is rotatably journaled in the bearing mounted brackets 38 and 40 located on top of the frame side members 18 and 20 respectively. Various types of power plants may be utilized. However, the particular power plant illustrated will be described as a gasoline two-cycle engine of the type most frequently used for marine engines and for outboard motors for rowboats, inflated rafts, etc. The two-cycle gasoline engine, as identified by the numeral 42 in FIGURE 1 is supported on a bracket 43 mounted on top of the frame 16 and includes a pull string 44, which is wrapped around the pulleys 41, for cranking the engine although it should be understood that an electric starting motor of the conventional type may be provided instead of cranking the engine 42 by hand. In addition, the gasoline engine 42 includes a manually operated throttle 46 for supplying the appropriate mixture of gasoline and air to the combustion chamber of the engine 42. A gear shift 48 is provided for shifting from one set of gears to another. An air filter 50 and the exhaust 52 are shown in FIGURE 1. The complete operation of the two-cycle gasoline engine is well understood in the art and need not be explained with any more detail.

However, it should be noted that a one-cycle or even a four-cycle engine may be utilized. Of course, it should be kept in mind that one of the important features of the invention is the lightweight characteristic of the entire vehicle 10 so that it may be readily folded and easily lifted into the trunk of an automobile.

The gasoline engine 42 has a power driven shaft 54 which has a sprocket 56 thereon which is in line with a larger sprocket 58 mounted on the axle 36. A chain 60 is wrapped around sprockets 56 and 58 so as to supply a driving connection between the power shaft 54 and the axle 36.

A seat supporting structure or frame 62 includes a horizontal member 64 which includes the vertical seat member 66 for mounting the seat 68, and a pair of downwardly extending legs 70 which are secured to the frame members 18 and 20, as is best shown in FIGURE 1. In addition, another leg 72 is centrally located so as to connect the horizontal member 64 with the laterally extending frame member 30. Receiving means 74 are provided, at the place where the members 64 and 72 join, to support the seat member 66. The seat member 66 is adjustable within the tubular receiving means 74 and is locked in a fixed position by a locking means 76. The seat 68 is secured to the seat member 66 through a nut and bolt arrangement identified by numeral 78.

A rear cover 80 is provided on the rear of the unit 14 to enclose part of the seat supporting structure. A front cover 82 is provided so as to partly enclose the power plant. Both covers help to provide a properly styled and attractive vehicle.

The front unit 12 is best shown in FIGURE 4. The substantially U-shaped vertical frame member 32 which forms parts of the rear unit 14 has a semi-cylindrical receiving portion 84 which is adapted to receive part of the front unit 12. The front unit 12 includes an offset arm, post or steering column 86 which has a fork carrying wheel connected thereto. In addition, carrying means 88 are provided on the front side of the arm 86, near the lower end thereof, for supporting a golf bag 90. Clamps 92 are connected to the upper and lower ends of the offset arm 86 by suitable means so as to prevent the golf bag 90 from falling off from the carrying means 88. The golf bag 90 has a shoulder strap 91 so that the bag 90 may be carried manually in the conventional manner.

A fork 94 and the steering column 86 form the steering column assembly. The fork 94 includes a pair of spaced arms 96 for rotatably carying the front ground-engaging wheel 98. The wheel 98 is connected to the arms 96 through a nut and bolt arrangement 100. A fender or wheel guard 102 is provided for the wheel 98 and is connected to the offset member 86 through a readily detachable nut and bolt connection 104.

The upper inner end of the offset member 86 is provided with a pair of handle bars 106 so that the operator may steer or guide the vehicle during its operation. The carrying means 88 has a flange 108 which has a ground supporting roll or element 110 connected thereto. When the front unit 12 is not associated with the rear unit 14, it may be used independently thereof as a manually operated golf cart. The offset arm or steering column 86 is removably mounted on the fork 94 through the bolt and nut connection 95. The roll 110 has sufficient area so as to support the unit 12 in an upright position when used independently of the rear unit 14.

The fork 94 has a cylindrical portion 112 provided between two cylindrical shoulders 114 and 116. The cylindrical portion 112 is adapted to be received within the semi-cylindrical receiving portion 84 of the rear unit 14. The shoulders 114 and 116 rest against the top and the bottom of the receiving portion 84 as is best shown in FIGURE 1. The receiving portion 84 has a pair of threaded bolts 118 extending outwardly therefrom. A locating member or plate 120, having a cylindrical portion 122 is designed so as to rotatably retain the fork 94 in the receiving portion 84 of the rear unit 14. Wing nuts 124 lock the locating member 120 in position. The fork 94 is permitted to rotate within the cylinder so as to provide proper steering and guidance. The wheel 98 is shown in different operational positions in FIGURE 2.

A slidable foot-board or platform 126 is provided on top of the tubular frame. The foot-board 126 has a cutout portion 128 so as to permit the wheel 98 to be turned through at least 90 degrees without any interference. The foot-board 126 is adapted to be slid inwardly with the extension members 22 and 24 when the unit is folded for transportation. The foot-board 126 is notched in various places so as to permit it to be slid inwardly without interference from various parts of the rear unit.

When is is desirable to fold the preferred embodiment into a substantially smaller package, the following sequence of operation takes place: Initially, the front unit 12 is removed from the frame 16 by removing the wing nuts 124 and plate 120 from the bolts 118 and separating the fork 94 from the receiving portion 84. After the front unit 12 has been removed from the tubular frame, the cotter pins 28 and bolts 26 are removed and the extension members 22 and 24 are slid inwardly (thereby reducing the length of the frame) carrying with them the foot-board 126. The substantially U-shaped vertical member 32 moves to the position shown by the dotted line in FIGURE 2. After the frame has been telescoped, the seat 68 is lowered by merely adjusting the locking means 76. It is apparent that the vehicle has been reduced in length and height so as to provide a package which is convenient to lift and to transport in the trunk of an automobile. The entire front unit 12 is transported with the frame carrying rear unit 14 or it may be transported independently thereof.

Another embodiment of the invention utilizes the following sequence of operation: The offset arm or steering column 86 is removed from the wheel-carrying fork 94 by removing the wing nut connection 95 and the detachable connection 104. The golf bag 90 and arm 86 are separated from the rest of the vehicle. The pins 28 and bolts 26 are then removed and the wheel-carrying fork 94 is moved inwardly with the extension members 22 and 24 which telescope within the side members 18 and 20 respectively. The front wheel 98 is rotated 90 degrees from the position shown by the solid lines in FIGURE 2 so that it lies in a plane which is substantially parallel to the U-shaped vertical member 32. The retracted position of the member 32 and wheel 98 is represented by the dotted lines in FIGURE 2. The seat 68 is lowered by merely adjusting the locking means 76. In this embodiment, the vehicle has been substantially reduced in length and height so as to provide a vehicle which is convenient for transporting in the trunk of an automobile. The golf bag 90 and arm 86 may also be carried in the trunk.

In either embodiment it takes only a few relatively simple mechanical steps for reassembling the vehicle. This may be accomplished with a minimum amount of time and labor.

Another embodiment of this invention provides for the horizontal extension members 22 and 24 and the substantially U-shaped vertical front member 32 to be connected to as part of, or mounted on, the front unit. In other words, the front and rear units each has a frame wherein the frame of the front unit telescopes within the tubular frame of the rear unit. The floor or foot-board slides with the frame of the front unit. In either construction, the extension members 22 and 24 may be constructed to have a larger inside diameter than the outside diameter of the side members 18 and 20 so that the extension members will slide on the side members or that the side members will be slid into the extension members.

Although this invention has been primarily described in the specification as a golf vehicle, it should be understood that it has other applications including use as a mail delivery vehicle, etc.

From the description it is apparent that the invention is characterized by its unique structural arrangement which permits the power-driven vehicle to be easily folded or retracted into a small and compact package with a minimum amount of time and labor. The invention provides a lightweight efficient and economical vehicle which is easy to handle, carry, assemble and disassemble.

The drawings and the foregoing specification constitute a description of the improved riding golf cart in such full, clear, concise and exact terms as to enable any person skilled in the art to practice the invention, the scope of which is indicated by the appended claims.

What I claim as my invention is:

1. A portable self-propelled vehicle having an operating position and a non-operating position comprising a front steering unit, a telescoping frame including a pair of parallel tubular side members and a pair of parallel tubular extension members having portions which are movable in the interior of said side members to an extended position and a non-extended position corresponding to the operating position and non-operating position of the vehicle respectively, an axle mounted on said side members near the rear thereof, a pair of transversely spaced ground engaging wheels mounted on said axle exteriorly of said side members, a transversely extending U-shaped bracket having its ends connected to the outer ends of said extension members and lying in a plane which is perpendicular to the plane of said frame, a power plant mounted on said side members, drive means connecting said power plant to said axle, a transversely extending bracing member connecting the rear ends of said side members, an upwardly extending mounting bracket having its lower end connected to said bracing member, means for mounting a vehicle seat on the other end of said mounting bracket, said front steering unit comprising a central ground engaging wheel and steering column assembly, detachable means on said U-shaped bracket for journaling said steering column assembly so as to permit said central ground engaging wheel to be turned throughout a substantial angular range, and removable fastening means extending through said side members and said extension members so as to hold said members in an extended position, said fastening means being removed to permit said extension members to be moved into the interior of said side members to the non-extended position, thereby reducing the overall length of said frame.

2. A portable self-propelled vehicle having an operating position and a non-operating position comprising a front steering unit, a telescoping frame including a pair of parallel tubular side members and a pair of parallel tubular extension members having portions which are movable in the interior of said side members to an extended position and a non-extended position corresponding to the operating position and non-operating position of the vehicle respectively, an axle mounted on said side members near the rear thereof, a pair of transversely spaced ground engaging wheels mounted on said axle exteriorly of said side members, a transversely extending U-shaped bracket having its ends connected to the outer ends of said extension members and lying in a plane which is perpendicular to the plane of said frame, a power plant mounted on said side members, drive means connecting said power plant to said axle, a transversely extending bracing member connecting the rear ends of said side members, an upwardly extending mounting bracket having its lower end connected to said bracing member, adjustable means for mounting a vehicle seat on the other end of said mounting bracket, said seat being located directly above said power plant, said front steering unit comprising a central ground engaging wheel and steering column assembly, detachable means on said U-shaped bracket for journaling said steering column assembly so as to permit said central ground engaging wheel to be turned throughout a substantial angular range, and removable fastening means extending through said side members and said extension members so as to hold said members in an extended position, said fastening means being removed to permit said extension members to be moved into the interior of said side members to the non-extended position, thereby reducing the overall length of said frame.

3. A portable self-propelled vehicle having an operating position and a non-operating position comprising a front steering unit, a telescoping frame including a pair of parallel tubular side members and a pair of parallel tubular extension members having portions which are movable in the interior of said side members to an extended position and a non-extended position corresponding to the operating position and non-operating position of the vehicle respectively, an axle mounted on said side members near the rear thereof, a pair of transversely spaced ground engaging wheels mounted on said axle exteriorly of said side members, a transversely extending U-shaped bracket having its ends connected to the outer ends of said extension members and lying in a plane which is perpendicular to the plane of said frame, a power plant mounted on said side members, drive means connecting said power plant to said axle, said front steering unit comprising a central ground engaging wheel and steering column assembly, detachable means on said U-shaped bracket for journaling said steering column assembly, so as to permit said central ground engaging wheel to be turned throughout a substantial angular range, removable fastening means extending through said side members and said extension members so as to hold said members in an extended position, and a slidable floor board on said frame spanning said extension members when in an extended position, said fastening means being removed to permit said extension members to be moved into the interior of said side members to the non-extended position, thereby reducing the overall length of said frame, said floor board being slid onto said side members during the reduction in length of said frame.

4. A portable self-propelled vehicle having an operating position and a non-operating position comprising a front steering unit, a telescoping frame including a pair of parallel tubular side members and a pair of parallel tubular extension members having portions which are movable in the interior of said side members to an extended position and a non-extended position corresponding to the operating position and non-operating position of the vehicle respectively, an axle mounted on said side members near the rear thereof, a pair of transversely spaced ground engaging wheels mounted on said axle exteriorly of said side members, a transversely extended U-shaped bracket having its ends connected to the outer ends of said extension members and lying in a plane which is perpendicular to the plane of said frame, a power plant mounted on said side members, drive means connecting said power plant to said axle, a transversely extending bracing member connecting the rear ends of said side members, an upwardly extending mounting bracket having its lower end connected to said bracing member, means for mounting a vehicle seat on the other end of said mounting bracket, said front steering unit comprising a central ground engaging wheel and steering column assembly, detachable means on said U-shaped bracket for journaling said steering column assembly so as to permit said central ground engaging wheel to be turned throughout a substantial angular range, removable fastening means extending through said side members and said extension members so as to hold said members in an extended position, said fastening means being removed to permit said extension members to be moved into the interior of said side members to the non-extended position, thereby reducing the overall length of said frame, and a golf bag holder secured to said steering column assembly on the front side of said central ground engaging wheel.

5. A portable self-propelled vehicle having an operating position and a non-operating position comprising a front steering unit, a telescoping frame including a pair of parallel side members and a pair of parallel extension members movable relative to said side members to an extended position and to a non-extension position corresponding to the operating position and non-operating position of the vehicle respectively, an axle mounted on said side members, a pair of transversely spaced ground engaging wheels mounted on said axle exteriorly of said side members, a transversely extending U-shaped bracket having its ends appropriately connected to said extension members and lying in a plane which is substantially perpendicular to the plane of said frame, a power plant mounted on said side members, drive means connecting said power plant to said axle, said front steering unit comprising a central ground engaging wheel and steering column assembly, detachable means on said U-shaped bracket for journaling said steering column assembly so as to permit said central ground engaging wheel to be turned throughout a substantial angular range, fastening means securing said extension members to said side members when in an extended position, said fastening means being adjustable to permit said extension members to be moved relative to said side members to the non-extended position, thereby reducing the overall length of said frame, a bracket attached to the lower end of said steering column assembly for supporting a golf bag, and a ground engaging element attached to the underside of said golf bag bracket.

6. A manually operable golf cart comprising an integral elongated substantially upright steering column which includes substantially parallel elongated upper and lower portions which are connected by an offset portion, a fork at one side of said column including a member having an axis, upper and lower pairs of spaced arms provided on the ends of said member respectively, said arms being spaced on opposite sides of the axis of said member, said upper arms straddling the upper portion of said steering column at a point immediately above said offset portion, adjustable fastening means connecting said upper arms to said upper portion, a shaft carried by said lower arms, a single ground engaging wheel rotatably carried by said shaft in between said lower arms, handle grips at the upper end of said steering column on said one side thereof, and a bracket on the opposite side of said column attached to the lower end of said steering column for supporting a golf bag.

7. A manually operable golf cart comprising an integral elongated substantially upright steering column which includes substantially parallel elongated upper and lower portions which are connected by an offset portion, a fork at one side of said column including a member having an axis, upper and lower pairs of spaced arms provided on the ends of said member respectively, said arms being spaced on opposite sides of the axis of said member, said upper arms straddling the upper portion of said steering column at a point immediately above said offset portion, adjustable fastening means connecting said upper arms to said upper portion, a shaft carried by said lower arms, a single ground engaging wheel rotatably carried by said shaft in between said lower arms, handle grips at the upper end of said steering column on said one side thereof, a bracket on the opposite side of said column attached to the lower end of said steering column for supporting a golf bag, and a ground engaging element attached to the underside of said bracket for providing stability for said cart when at rest to hold the steering column in a substantially upright position.

8. A manually operable golf cart comprising an integral elongated substantially upright steering column which includes substantially parallel elongated upper and lower portions which are connected by an offset portion, a fork at one side of said column including a member having an axis, upper and lower pairs of spaced arms provided on the ends of said member respectively, said arms being spaced on opposite sides of the axis of said member, said upper arms straddling the upper portion of said steering column at a point immediately above said offset portion, adjustable fastening means connecting said upper arms to said upper portion, a shaft carried by said lower arms, a single ground engaging wheel rotatably carried by said shaft in between said lower arms, handle grips at the upper end of said steering column on said one side thereof, a bracket on the opposite side of said column attached to the lower end of said steering column for supporting a golf bag, a ground engaging element attached to the underside of said bracket for providing stability for said cart when at rest to hold the steering column in a substantially upright position, a wheel guard in between the lower arms and overlying said wheel, and fastening means connecting said wheel guard to said lower portion of said steering column.

9. A portable self-propelled vehicle having an operating position and a non-operating position comprising a front steering unit, a telescoping frame including a pair of parallel side members and a pair of parallel extension members movable relative to said side members to an extended position and to a non-extended position corresponding to the operating position and non-operating position of the vehicle respectively, an axle mounted on said side members, a pair of transversely spaced ground engaging wheels mounted on said axle exteriorly of said side members, a transversely extending U-shaped bracket having its ends appropriately connected to said extension members and lying in a plane which is substantially perpendicular to the plane of said frame, a power plant mounted on said side members, drive means connecting said power plant to said axle, said front steering unit comprising a central ground engaging wheel and steering column assembly, detachable means on said U-shaped bracket for journaling said steering column assembly so as to permit said central ground engaging wheel to be turned throughout a substantial angular range, fastening means securing said extension members to said side members when in an extended position, said fastening means being adjustable to permit said extension members to be moved relative to said side members to the non-extended position, thereby reducing the overall length of said frame, a bracket attached to the lower end of said steering column assembly for supporting a golf bag, a ground engaging element attached to the underside of said golf bag bracket, a wheel guard overlying said ground engaging wheel, and fastening means connecting said wheel guard to said steering column assembly.

10. A portable self-propelled vehicle having an operating position and a non-operating position comprising a removable front steering unit, a telescoping frame including a pair of parallel side members and a pair of parallel extension members movable relative to said side members to an extended position and to a non-extended position corresponding to the operating position and non-operating position of the vehicle respectively, an axle mounted on said side members, a pair of transversely spaced ground engaging wheels mounted on said axle, a bracket having its ends appropriately connected to said extension members, a power plant carried by said side members, drive means connecting said power plant to said axle, said removable front steering unit comprising a central ground engaging wheel and steering column assembly, detachable means on said bracket for journaling said steering column assembly to permit said central ground engaging wheel to be turned throughout a substantial angular range, fastening means securing said extension members to said side members when in an extended position, and a slidable floor board on said frame spanning said extension members when in an extended position, said fastening means being adjusted to permit said extension members to be moved relative to said side members to the non-extended position, thereby reducing the overall length of said frame, said floor board being adapted to be slid onto said side members during the reduction in length of said frame.

11. A portable self-propelled vehicle defined in claim 10 wherein said bracket is substantially U-shaped and lies in a plane which is substantially perpendicular to the plane of said frame.

12. A portable self-propelled vehicle defined in claim 10 wherein said side members and said extension members are tubular, and said extension members include portions which are movable in the interior of said side members to the extended and non-extended positions.

13. A portable self-propelled vehicle defined in claim 10 wherein a transversely extending bracing member connects the rear ends of said side members, an upwardly extending mounting bracket having its lower end connected to said bracing member, and means for mounting a vehicle seat on the other end of said mounting bracket.

14. A portable self-propelled vehicle defined in claim 13 wherein said last mentioned means are adjustable.

15. A portable self-propelled vehicle defined in claim 10 wherein a golf bag holder is secured to said steering column assembly on the front side of said central ground engaging wheel.

16. A portable self-propelled vehicle defined in claim 10 wherein a bracket is secured to the lower end of said steering column assembly for supporting a golf bag, and a ground engaging element attached to the underside of said golf bag bracket.

References Cited in the file of this patent

UNITED STATES PATENTS

| | | |
|---|---|---|
| D. 187,787 | MacCoon | May 3, 1960 |
| 2,565,848 | Howard | Aug. 28, 1951 |
| 2,613,952 | Lannon | Oct. 14, 1952 |
| 2,687,895 | Rutledge | Aug. 31, 1954 |
| 2,696,272 | Schlaphoff | Dec. 7, 1954 |
| 2,749,997 | Deslippe | June 12, 1956 |
| 2,793,871 | Stableford | May 28, 1957 |
| 2,839,146 | Bouffort | June 17, 1958 |
| 2,919,756 | Knipe | Jan. 5, 1960 |
| 2,919,758 | Newton et al. | Jan. 5, 1960 |

FOREIGN PATENTS

| | | |
|---|---|---|
| 473,359 | Italy | Aug. 24, 1952 |